(12) United States Patent
Blakeslee et al.

(10) Patent No.: US 11,759,957 B2
(45) Date of Patent: Sep. 19, 2023

(54) SYSTEM AND METHOD FOR MEMBER ARTICULATION

(71) Applicant: Hamilton Sundstrand Corporation, Charlotte, NC (US)

(72) Inventors: Brigid A. Blakeslee, Manchester, CT (US); Edward Tunstel, Jr., Canton, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 163 days.

(21) Appl. No.: 17/187,533

(22) Filed: Feb. 26, 2021

(65) Prior Publication Data

US 2021/0268661 A1 Sep. 2, 2021

Related U.S. Application Data

(60) Provisional application No. 62/983,228, filed on Feb. 28, 2020.

(51) Int. Cl.
*B25J 9/16* (2006.01)
*B25J 13/08* (2006.01)

(52) U.S. Cl.
CPC .......... *B25J 9/1697* (2013.01); *B25J 9/1664* (2013.01); *B25J 13/089* (2013.01)

(58) Field of Classification Search
CPC ....... B25J 9/1697; B25J 9/1664; B25J 13/089
See application file for complete search history.

(56) References Cited

U.S. PATENT DOCUMENTS

| | | | |
|---|---|---|---|
| 6,681,151 B1 * | 1/2004 | Weinzimmer | B25J 9/1697 356/243.1 |
| 9,542,743 B2 | 1/2017 | Tenney et al. | |
| 9,555,549 B2 | 1/2017 | Motoyoshi et al. | |
| 10,046,459 B2 | 8/2018 | Wang et al. | |
| 10,434,655 B2 | 10/2019 | Suzuki | |
| 2012/0294509 A1 * | 11/2012 | Matsumoto | B25J 9/1697 382/153 |
| 2013/0041508 A1 | 2/2013 | Hu et al. | |
| 2015/0105907 A1 * | 4/2015 | Aiso | B25J 9/1633 901/47 |
| 2020/0023521 A1 | 1/2020 | Dan | |
| 2021/0044069 A1 * | 2/2021 | Hoffmann | G06V 10/48 |

OTHER PUBLICATIONS

Rajive Joshi et al: "Application of Feature-Based Multi-View Servoing for Lamp Filament Alignment",IEEE ROBOTICS & Automation Magazine, IEEE Service Center, Piscataway, NJ, US, vol. 5, No. 4, Dec. 1, 1998 (Dec. 1, 1998), pp. 25-32, XP011089717, ISSN: 1070-9932 p. 25-p. 29; figures 1,2 "*p. 30; figure 6 ".

(Continued)

*Primary Examiner* — Jeff A Burke
*Assistant Examiner* — Joshua Alexander Garza
(74) *Attorney, Agent, or Firm* — Locke Lord LLP; Joshua L. Jones; Gabrielle L. Gelozin

(57) ABSTRACT

A system including a robot mean to move a member by using a first camera coupled to the robot, a second camera coupled to the robot, a control device configured to control position of the robot in order to minimize a pixel-wise distance between the member and a target based on alternating input from the first camera and the second camera.

17 Claims, 1 Drawing Sheet

(56) References Cited

OTHER PUBLICATIONS

Triyonoputro Joshua C et al: "Quickly Inserting Pegs into Uncertain Holes using Multi-view Images and Deep Network Trained on Synthetic Data", 2019 IEEE/RSJ International Conference On Intelligent Robots and Systems (IROS), IEEE,Nov. 3, 2019 (Nov. 3, 2019), pp. 5792-5799, XP033695649.
Extended European search report issued in corresponding EP application No. 21157585.7 dated Jul. 19, 2021.

* cited by examiner

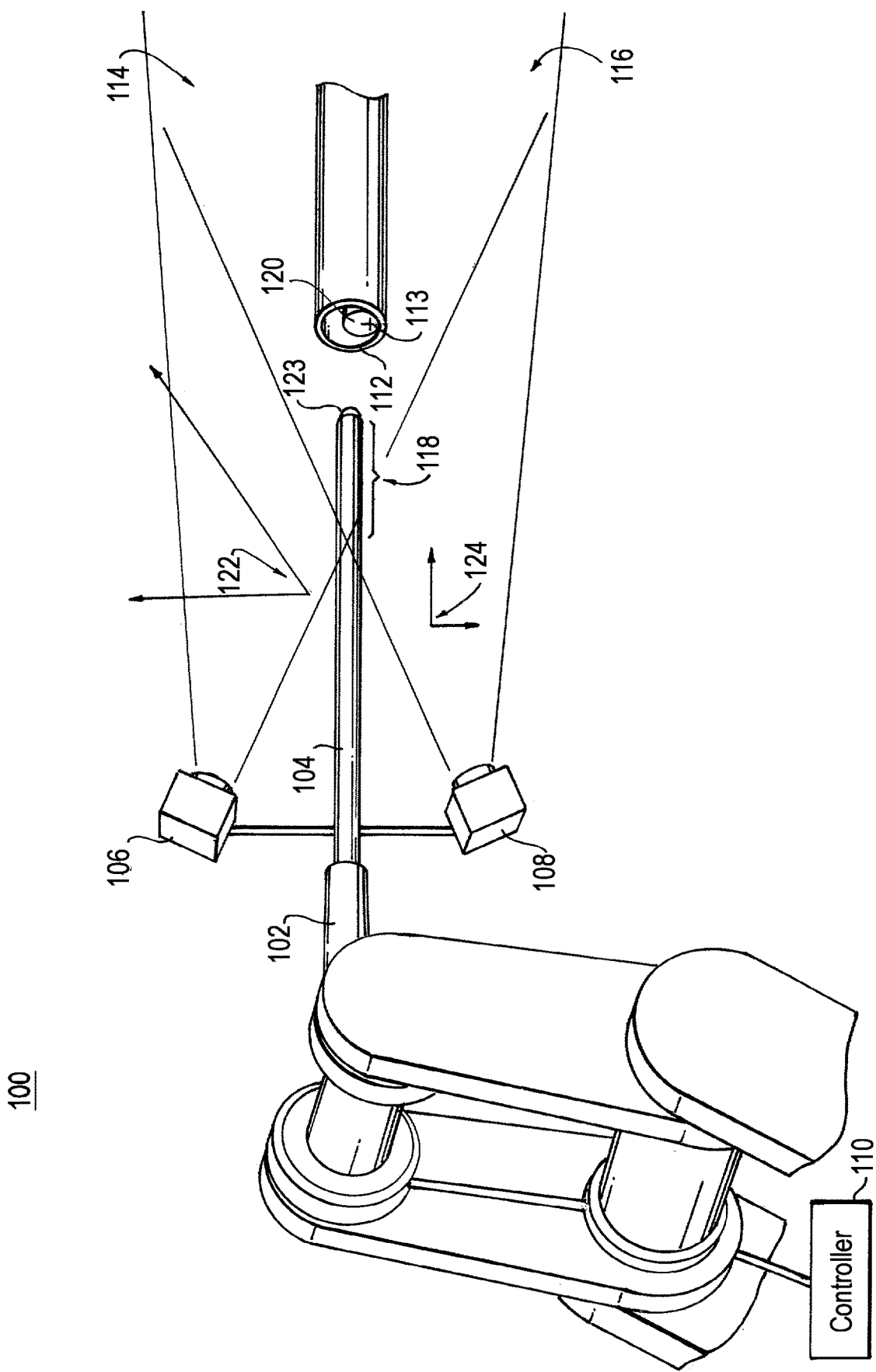

SYSTEM AND METHOD FOR MEMBER ARTICULATION

CROSS-REFERENCE TO RELATED APPLICATIONS

This application claims priority to and the benefit of U.S. Provisional Application No. 62/983,228, filed Feb. 28, 2020, the entire contents of which are herein incorporated by reference in their entirety.

STATEMENT REGARDING FEDERALLY SPONSORED RESEARCH OR DEVELOPMENT

This invention was made with government support under contract number W911NF-17-3-0004 awarded by the National Aeronautics and Space Administration. The government has certain rights in the invention.

BACKGROUND

Technological Field

The present disclosure relates to a system and method of servoing, specifically a system and method of visual stepping servoing.

Description of Related Art

Robot apparatuses are widely used in production of industry products. With respect to such robot apparatuses, a system configuration is known in which a robot and detection performed by a visual sensor are combined with each other in order to automatically and accurately pick up and assemble workpieces by inserting pieces one into another. Visual servoing is a well-developed approach to using computer vision to guide motion towards reaching the goal position. Two main approaches to visual servoing are primarily used, namely image based visual servoing, which relies purely on visual feedback to determine when a target position has been reached, and position based visual servoing, where vision is used to determine position information about a scene to enable a robotic agent to reach a goal location.

The conventional methods and systems have generally been considered satisfactory for their intended purpose. However, there is still a need in the art for servoing having improved speed and accuracy. There also remains a need in the art for such systems and methods that are economically viable. The present disclosure may provide a solution for at least one of these remaining challenges.

SUMMARY OF THE INVENTION

A system including a robot configured to hold and articulate a member, a first camera coupled to the robot, a second camera coupled to the robot, and a control device configured to control position of the robot in order to minimize a pixel-wise distance between the member and a target based on alternating input from the first camera and the second camera. The first camera can be directed in a first direction and the second camera can be directed in a second direction. The first direction is different than the second direction. The robot can move in three dimensions. The first camera and the second camera can be oriented such that at least a portion of the member and a portion of the target are both in a field of view of each camera. The target can be an orifice configured to receive at least a portion of the member. The member can be a wire.

A method for controlling the robot includes obtaining a first measurement between a portion of a member and a target by a first camera, articulating the member by a robot in a first direction based on the measurement from the first camera until a planar view provided by the first camera converges the member and the target in the first direction, obtaining a second measurement between the portion of the member and the target by a second camera, and articulating the member by the robot in a second direction based on the measurement from the second camera until a planar view provided by the alternate camera converges the member and the target in the second direction. It is also considered that a direction can be any pair of directions, which are not necessarily orthogonal to each other. The first direction can be orthogonal to the second direction. The first direction can include a single plane and the second direction can include a single plane. The first measurement and the second measurement can be pixel-wise distances.

The first camera can obtain multiple measurements and articulates the member multiple times towards the target before the second camera obtains a measurement. The second camera can also obtain a measurement, and does not have to necessarily until the hand-off in control occurs, but does not have any part in driving the motion of the robot while the first camera is responsible for driving the motion. When measuring distances a point on the member and a point on the target point are identified by image processing. The image processing includes filtering an image of the point of the member and an image of the target point by color, by geometry, or template matching.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 1 is a schematic view of a system for servoing according to an embodiment of this disclosure.

DETAILED DESCRIPTION

Reference will now be made to the drawings wherein like reference numerals identify similar structural features or aspects of the subject invention. For purposes of explanation and illustration, and not limitation, a partial view of an exemplary embodiment of a servoing system in accordance with the invention is shown in FIG. 1 and is designated generally by reference character 100. The methods and systems of the invention can be used to support robust convergence of a member articulated robot to a goal point without overhead of camera calibration or point triangulation.

FIG. 1 shows the servoing system 100 including a robot 102, which can include an arm, capable of movement in three dimensions, holding and articulating a member 104. The member 104 can be wire. The wire can be rigid or is also considered to be flexible and malleable. A first camera 106 and a second camera 108 are coupled to the robot arm 102. A control device 110 is used to control position of the robot arm 102 in order to minimize a distance (d) between the member 104 and a target 112 based on alternating input from the first camera 106 and the second camera 108. The target 112 is an orifice meant to receive at least a portion 118 of the member 104. The first camera 106 is directed in a direction having a first field of view 114 and the second camera 108 is directed in a second direction having a second field of view 116, wherein the first direction is different than the second direction, and the first field of view 114 is different than the second field of view 116. The control device 110 alternates articulation of the member 104 based on input from the first camera 106 and the second camera 108 intermittently and switches between these two cameras until at least a portion 118 of the member 104 reaches the target 112. The first camera 106 and the second camera 108 are oriented such that at least a portion 118 of the member 104 and a portion of the target 120 are both in a field of view of each camera 106, 108.

Each camera 106, 108 identifies a point 123 on the member 104 and a target point 113 on the target 112 in order to converge the member 104 and the target. Identification includes image processing by filtering an image of the point 123 of the member 104 and an image of the target point 113 by color, by geometry, or template matching. The identified points 113, 123 are tracked throughout the convergence process.

The robot arm 102 is controlled by obtaining a first pixel-wise measurement between a portion 118 of the member 104 and the target 112 by the first camera 106 and articulating the member 104 in a first direction 122 based on the measurement from the first camera 106 until a planar view provided by the first camera 106 converges the member 104 and the target 112 in the first direction 122, then obtaining a second pixel-wise measurement between the portion 118 of the member 104 and the target 112 by the second camera 108, and articulating the member 104 in a second direction 124 based on the measurement from the second camera 108 until a planar view provided by the second camera 108 converges, the steps are then repeated until the member 104 reaches or is inserted into the target 112. Convergence for the first camera 106 is based only on measurements from the first camera 106 (unless the second camera 108 provides some feedback in limiting the amount of error that movements driven by the first camera 106 can incur), and vice versa.

It is also considered that several measurements can be taken by the first camera 106 while it is iteratively 'stepping' the member 104 towards the target 112 before control is handed off to the second camera 108, when it too takes its measurement. The first camera 106 can obtain multiple measurements and articulate the member 104 multiple times towards the target 112 before the second camera obtains a measurement and vice versa.

The movement done by the robot arm 102 in the first direction 122 are made in a single plane, such as the x-y plane, the x-z plane etc. The movement done by the robot arm 102 in the first direction 122 are orthogonal to the plane of second direction 124. It is also considered that the planes are not made of orthogonal coordinates to each other but are made of any two different vectors. Each camera 106, 108 is responsible for driving motion along two axes and forming a plane that may or may not be coincident with an image plane. Motion of the robot arm 102 is in a single axis at a time—e.g., along the x-axis, in the plane initially defined by either camera 106, 108 and then along a perpendicular axis in the same plane. The planes are defined in the coordinate frame of the motion, which has its origin on the end of the robot gripper. Each camera 106, 108 allows the robot arm 102 to takes several steps—whether in uncoupled axes ie, first camera 106 makes a correction in x, then z, then x, then z, then x again, before handing off to second camera 108 to make a correction in y, then z, then y, then z, then y, before handing off back to the first camera 106. It is also considered that each of the movements can be done along a vector formed by those components individual axes.

The methods and systems of the present disclosure, as described above and shown in the drawings, provide for a servoing system with superior properties including increased reliability and stability. While the apparatus and methods of the subject disclosure have been shown and described with reference to embodiments, those skilled in the art will readily appreciate that changes and/or modifications may be made thereto without departing from the spirit and score of the subject disclosure.

What is claimed is:

1. A system comprising:
    a robot configured to move a member;
    a first camera coupled to the robot configured to measure a first measurement between a portion of the member and a target;
    a second camera coupled to the robot configured to measure a second measurement between the portion of the member and the target; and
    a control device configured to control position of the robot in order to decrease the first measurement below a first selected value and the second measurement below a second selected value pixel-wise, wherein control of the position of the member occurs in a single axis at a time, wherein the control device is configured to move the member several steps at a time along a first set of axes based on input from the first camera before handing off control to the second camera, wherein the control device is configured to move the member several steps at a time along a second set of axes, different from and uncoupled relative to the first set of axes based on input from the second camera before handing off control back to the first camera.

2. The system of claim 1, wherein the first camera is directed in a first direction and the second camera is directed in a second direction.

3. The system of claim 1, wherein the first direction is different than the second direction.

4. The system of claim 1, wherein the robot is configured to move in three dimensions.

5. The system of claim 1, wherein the control device is configured to alternate articulation control from the first camera to the second camera and back to the first to articulate the member held by the robot towards the target.

6. The system of claim 1, wherein the first camera and the second camera are oriented such that at least a portion of the member and a portion of the target are both in a field of view of each camera.

7. The system of claim 1, wherein the target is an orifice configured to receive at least a portion of the member.

8. The system of claim 1, wherein the member is a wire.

9. A method for controlling a member robotically comprising:
    obtaining a first measurement between a portion of the member and a target with a first camera;

articulating the member robotically until the first measurement converges the member and the target to a first selected value;

obtaining a second measurement between the portion of the member and the target with a second camera;

articulating the member robotically until the second measurement reaches converges the member and the target to a second selected value; and using a control device to move the member several steps at a time along a first set of axes based on input from the first camera before handing off control to the second camera and using the control device to move the member several steps at a time along a second set of axes, different from and uncoupled relative to the first set of axes based on input from the second camera before handing off control back to the first camera.

10. The method of claim 9, wherein the member is articulated in a first direction based on the measurement from the first camera.

11. The method of claim 10, wherein the member is articulated in a second direction based on the measurement of the second camera.

12. The method of claim 11, wherein the first direction is orthogonal to the second direction.

13. The method of claim 9, wherein the first direction includes a single plane and the second direction includes a single plane.

14. The method of claim 13, wherein the first measurement and the second measurement are pixel-wise distances.

15. The method of claim 9, wherein the first camera obtains multiple measurements and articulates the member multiple times towards the target before the second camera obtains a measurement.

16. The method of claim 9, wherein a point on the member and a point on the target point are identified by image processing.

17. The method of claim 16, wherein the image processing includes filtering an image of the point of the member and an image of the target point by color, by geometry, or template matching.

* * * * *